(12) United States Patent
Tan et al.

(10) Patent No.: US 6,816,813 B2
(45) Date of Patent: Nov. 9, 2004

(54) PROCESS FOR DETERMINING COMPETING CAUSE EVENT PROBABILITY AND/OR SYSTEM AVAILABILITY DURING THE SIMULTANEOUS OCCURRENCE OF MULTIPLE EVENTS

(75) Inventors: Jonathan Samuel Tan, Cincinnati, OH (US); Oscar Rosen, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 19 days.

(21) Appl. No.: 10/272,156

(22) Filed: Oct. 15, 2002

(65) Prior Publication Data

US 2004/0078167 A1 Apr. 22, 2004

(51) Int. Cl.⁷ .............................................. G06F 17/26
(52) U.S. Cl. .......................................... 702/181; 714/47
(58) Field of Search ............................. 702/181, 33–35, 702/57–59, 81, 176, 182–184, 189; 714/100, 1, 2, 47, 48, 715, 728; 706/56; 703/14–17

(56) References Cited

U.S. PATENT DOCUMENTS 6,351,754 B1 * 2/2002 Bridge et al. ............... 707/202
6,598,184 B1 * 7/2003 Merget et al. ............... 714/47
6,625,636 B1 * 9/2003 Skovira ...................... 709/102

OTHER PUBLICATIONS http://www.asp.ucar.edu/colloquium/1992/notes/part1/node20.html, Nov. 12, 2002.
http://www.math.uah.edu/stat/point3.html, Nov. 12, 2002.
http://www.basic.nwu.edu/statguidefiles/survival.html, Nov. 12, 2002.
http://physics.valpo–edu/courses/p310/ch4_maxLike/sld001.htm, Jun. 18, 2002.

* cited by examiner

*Primary Examiner*—Marc S. Hoff
*Assistant Examiner*—Edward Raymond
(74) *Attorney, Agent, or Firm*—Larry L. Huston; Leonard W. Lewis; Steven W. Miller

(57) ABSTRACT

A method for determining the probability of observing an event. The event may occur either alone or in combination with one or more other events. The method may be non-combinatorial in that it does not require a separate calculation for each simultaneously occurring event, thereby significantly reducing computation time for complex systems having multiple events. Further, the method may be numerically reversed to calculate the probability of an event occurring based upon the number of observations. The method is particularly useful for predicting availability, component failure, or the possibility of a false start in production systems.

18 Claims, No Drawings

PROCESS FOR DETERMINING COMPETING CAUSE EVENT PROBABILITY AND/OR SYSTEM AVAILABILITY DURING THE SIMULTANEOUS OCCURRENCE OF MULTIPLE EVENTS

FIELD OF THE INVENTION

The present invention relates to a method for determining system availability and more particularly to a method which does not rely upon system simulation and which can consider the simultaneous failure of multiple components. The invention may also be used to generally determine the probability of observing an event under various circumstances.

BACKGROUND OF THE INVENTION

Complex systems may be modeled as having uptimes when the system is running and downtimes when the system is not. When the system is running it is assumed to be performing its intended function at full efficiency. When the system is down it is assumed to not be performing its function at all. The system is assumed to be repairable and the components functionally connected in series without redundant components or surge capability. In addition to downtime caused by component failures which may occur as a function of wearout or are catastrophic, downtime may occur as a repeating function of time, e.g. due to exhaustion of batch raw materials, routine equipment shutdowns, etc. Downtimes may be caused by components, failure modes, and other causes, which terms shall be used interchangeably.

The goal is to carefully plan and minimize the downtimes so that the uptime is maximized. Also one wishes to avoid intermediate states where the system operates at partial efficiency.

For the purpose of the present invention, systems can only be in one of two states. Either they are fully operational and running or producing product at a given rate, also known as uptime. Uptime is defined as the time that the system is operating. The system may not be operational as a result of a failure or planned stop events, also known as downtime. Downtime is defined as the time that the system is non-operational or stopped. We model transitional states between downtime and uptime, or vice versa, as very brief relative to typical uptimes, otherwise the transition period will be converted to an equivalent production loss downtime.

The mean time between failures in a given time period (MTBF) is the ratio of the total system uptime to the number of failures which occur during that period. The mean time to repair in a given time period (MTTR) is the ratio of the total system downtime to the number of failures which occur during that period. Availability is the ratio of total system uptime to the total time (uptime plus downtime) the system is under study. Availability may be therefore quantified as $$\text{Availability} = MTBF_{sys}/(MTBF_{sys}+MTTR_{sys}). \qquad 1$$

where MTBF is the average uptime, MTTR is the average downtime, and the subscript "sys" refers to the overall system, as opposed to an individual component.

One of skill analyzing a system is interested in the availability because it is a measure of system performance relative to asset utilization. There are other measures of availability employable by one of skill, as discussed in the Handbook of Reliability Engineering and Management, Chap. 15, Ireson and Coombs, Jr. Editors in Chief, copyrt. 1998.

The uptimes and downtimes occur alternately. Downtimes can occur due to planned stop events such as scheduled maintenance and product changes, or due to a failure of one or more components within the system. Once the system is down, repair or maintenance action can be taken to restore components back to an operational state. Repair actions are classified by the condition of the component after the repair or maintenance. If the repair action restores the component back to its original condition it is called same as new (SAN). If the repair action restores the component back to the state of that component just prior to failing, it is referred to as same as old (SAO). The repair action may also restore the component to a state that is between SAN and SAO. If the repair is SAN, then the component will be in the same state that it was at the beginning of the system mission at time 0, just before the system started for the first time, thus making the component again subject to premature or burn-in failures.

In repairable production systems, it is possible that during an attempt to restart the equipment after all repairs are completed, the system will run only briefly without reaching its target rate. This failed attempt to restart the equipment is called a false start, also referred to in the literature as a failure on demand probability. For the process described and claimed hereunder, the uptime during a false start is considered to be zero.

A false start, as discussed above, may be caused by the occurrence of a single failure mode. Alternatively, a false start may be caused by the simultaneous occurrence of two or more failure modes. If two or more failure modes simultaneously occur and cause the false start, this is considered to be a tie between the failure modes which caused the false start. However, to improve the system, one may wish to know which failure mode is associated with the false start, or assign a particular failure mode to type of false start event. In order to determine which failure mode, among multiple failure modes, caused the false start, at least two illustrative and non-limiting methods may be used.

In systems with multiple components, failures can be categorized as competing or non-competing. In a competing failure mode system, the components are assumed to be in series such that if one component fails, the entire system has to stop. Every time the system stops, all components subject to failure in a competing system are automatically reset to a SAN state, including components that were not the original cause of the system stoppage. Because competing components are in series and reset to SAN on every stop, the uptimes between successive failures of a competing failure component are not independent of other failures in the system. For competing components, the time to next failure is measured from the last repair/replacement to occur in the system, without regard to which component has failed.

A non-competing component is either not in series with the other components in the system, or does not reset to SAN every time the system stops. Non-competing failures occur with an uptime that is independent of other failures in the system. Non-competing failures are typically caused by the wear or use of one or more non-competing components. A non-competing component is not repaired or reset to SAN unless it fails or is close to failing. Time to next failure for a non-competing component begins with the last repair/replacement of only that component, as opposed to the last system failure. In the literature known to the applicants for repairable production systems, failure modes are typically considered to be non-competing for the purpose of estimating availability. We have found that the use of competing failure models increases the accuracy of model predictions of availability. Therefore there is a need to model competing failure mode systems and mixed competing and non-competing failure mode systems. In the following analysis each mission, or use of the system, must start with components that are competing, except as set forth below for some systems that combine competing and some types of non-competing components.

Uptime can be characterized by a probability density function (PDF) distribution of the times between failures that do not include false starts, i.e. t>0. Similarly, downtime can be characterized by a PDF of the times it takes to restore the system back to operation. The area under a PDF curve between $t_1$ and $t_2$, for $t_2>t_1$, is the probability of observing values of t that are greater than $t_1$ but smaller than $t_2$, out of a large number of observed times. Given the uptime PDF, one of skill in the art can derive other important reliability expressions.

The reliability of a competing system at time t, R(t), is the probability that the system will successfully run for a period of duration t without stopping. The reliability, R(t), distribution can be derived from the uptime PDF by subtracting from one the integral to time t of the PDF and then multiplying the result by the probability of not having a false start. Mathematically, this is can be expressed as:

$$R_{uptime}(t)=1-\int_0^t f_{uptime}(t)d(t) \qquad 2$$

$$R(t)=R(0)*R_{uptime}(t) \qquad 3$$

where $R_{uptime}(t)$ is the reliability function for time between failures other than false starts, R(0) is the probability of not having a false start, and $f_{uptime}(t)$ is the uptime PDF for t>0.

The overall system reliability of a multi-component system can be obtained once the individual component reliabilities are specified. The product of the reliabilities of the individual components in a series component system gives the overall system reliability. Mathematically this may be expressed as:

$$R_{sys}(t)=\Pi(R_i(t)) \qquad 4$$

where $R_i(t)$ is the reliability function of component i and the product includes all components.

The system MTBF can be determined by the integral of the system reliability, above from 0 to infinity with respect to time. Mathematically this may be expressed as:

$$MTBF_{sys}=\int_0^\infty R_{sys}(t)d(t) \qquad 5$$

The hazard function h(t) is the instantaneous rate of failures occurring at any specific point in time. It can be obtained by dividing the PDF by R(t), so that $$h(t)=f(t)/R(t) \qquad 6$$

where f(t) is the PDF.

The h(t) can increase, decrease, be constant, bath tub-shaped, or have other changes with respect to time. An increasing h(t) may occur due to wear out of components, fatigue, poor preventive maintenance procedures, etc. A decreasing h(t) may occur due to improper start ups, raw materials changing properties during downtimes, etc. A constant h(t) may occur due to design flaws and accidental failures, such as human error or raw material defects. A bath tub shaped h(t) may occur from a combination of causes, some of which are increasing and some decreasing. In a bath tub shaped h(t) the failure rate may initially decrease during burn-in, remain relatively constant during the useful life of the system, then increase as component life is reached and wear out occurs.

To elaborate, burn in failures may occur due to poor manufacturing techniques, inadequate quality control, poor workmanship, inadequate system debugging, substandard materials, component failure due to improper storage, handling and installation, power surges, improper start up and other operator error. Failures during the useful life can occur due to differences between design strength and actual stress experienced during the useful life, ordinary variations in random loads, ordinary variations in material strengths, undetected defects, abuse, misapplication, and acts of God. Failures due to wear out and reaching the end of component life may occur due to degradation of material strength, creep, fatigue, corrosion, improper or erratic maintenance.

The MTTR for any component can be determined by the integral of the component time to repair distribution times time, from 0 to infinity with respect to time. Mathematically this may be expressed as:

$$MTTR_i=\int_0^\infty t * f_{time\ to\ repair\ i}(t)d(t) \qquad 7$$

where $f_{time\ to\ repair\ i}(t)$ is the PDF for the time to repair component i.

The system MTTR is simply the sum of the product individual component MTTR times the probability that the particular component cause the system to fail. Mathematically, this may be expressed as:

$$MTTR_{sys}=\Sigma(Pevent_i * MTTR_i) \qquad 8$$

where $MTTR_i$ is the mean time to repair or replace component i as needed, $Pevent_i$ is the probability that component i will cause the system to stop, and the summation includes all components.

For the process described and claimed hereunder, there are no simultaneous observed failures of more than one component.

There are ways known in prior art to analytically determine $Pevent_i$ for many non-competing systems given the uptime PDF for each component. However, there is no such approach found in the prior art known to Applicants to make this determination for competing systems with false starts, given the complex interaction between component uptimes. In competing failure mode systems, the time between failures and the false start frequencies depend on the behavior of all components in the system. The relative failure frequency for a single component cannot be isolated from the effects caused by the rest of the system.

The most common approach used in the prior art to evaluate system availability is simulation of the system. If system simulation is used, the analyst must determine how long to run the computer simulation of that model to achieve a desired accuracy. If the simulation is run too long, analyst time and computer time are wasted. If the simulation is not run long enough, sufficient accuracy may not be obtained. Accordingly, there is a need in the art for a simple solution to determine system availability. Such a solution would decouple accuracy and the length of simulation run time. Furthermore, such method can be used to identify the component which has the greatest impact on availability and thus help focus system improvement efforts.

In the literature known to the applicants for repairable production systems, failure modes are typically considered to be non-competing for the purpose of estimating availability. We have found that the use of competing failure models increase the accuracy of model predictions. Therefore there is a need in the art to model competing and mixed competing/non-competing failure mode systems.

SUMMARY OF THE INVENTION

The invention comprises a method of calculating the probability an event in a system will be observed during the occurrence of that event alone, or with one or more simultaneous events. The method is non-combinatorial and comprises the step of calculating the probability according to the equation $Pevent_i = \int_0^\infty h_i(t) * R_{sys}(t)dt + Pevent0_i$, wherein $Pevent_i$ is the probability that a particular event will be observed, $h_i(t)$ is the instantaneous rate of occurrence of event i, $R_{sys}(t)$ is the reliability function of the system in which the events may occur, and $Pevent0_i$ is the probability that an event will be observed when the event occurs simultaneously with k−1 other events, and i represents a particular event.

If desired, the first term on the right side of the equation $\int_0^{28} h_i(t) * R_{sys}(t)dt$ may be set equal to 0. The resulting equation then may be used to calculate the probability of any event occurring independently of other events being observed according to the equation $Pevent0_i = \Sigma_{n=1}^N y_i^{(n)}$ wherein $y_i^{(n)}$ is the probability the event of interest will be observed when said event occurs simultaneously with n−1 other events, and wherein N is the total number of possible events, where determining the probability that event i will be observed alone according to the equation $y_i^{(1)} = [(1-R_i(0))/R_i(0)] * \Pi_{j=1}^N R_j(0)$ wherein $R_j(0)$ is the probability the event will not occur, and calculating the probability that event i will be observed when event i occurs simultaneously with at least one other event. The method may be used for production systems, to determine the probability of failure upon restart of that system.

If desired, the second term on the right side of the equation ($Pevent0_i$) may be set equal to 0. This allows the equation to determine the probability an event in the system will be observed following start-up of the system according to the equation $$Pevent_i = \int_0^\infty h_i(t) * R_{sys}(t)dt.$$

All documents and web addressed cited are, in relevant part, incorporated herein by reference; the citation of any document is not to be construed as an admission that it is prior art with respect to the present invention.

DETAILED DESCRIPTION OF THE INVENTION

A system is any assembly of components, processes or functions which deliver, perform, act upon or improve a product or service. A component is any portion of a system which performs a function. The system has uptimes, other than false starts, and downtimes which can be separately characterized by the PDF, R(t), and the h(t), as noted above. In the following analysis each mission, or use of the system, starts with components that are competing, except as set forth below for some systems that combine competing and some types of non-competing components. Data are collected to assist in and start the analysis of the system. Relevant data may include start ups, failures, their causes, times of occurrence, preventive maintenance (both performed and opportunities not performed), uptime duration, and downtime duration.

The foregoing discussion has been directed to failures of one or more components within the system. However, the invention is not so limited. The invention described and claimed herein is also applicable to failure modes which do not specifically involve the failure of an individual component, or to observations of an event which may occur alone or with one or more other events, which terms shall be used interchangeably, as the context may require. More particularly, the system may not operate at its target efficiency or production rate, or may shut down altogether, in the absence of a failure by one or more components. This causes downtime of the system without a component failure. Thus, failure modes are inclusive of, and broader than, component failures. Failure modes may cause the system to have downtime due to reasons that are inclusive of component failures and inclusive of other causes of failures. For example, ambient conditions, raw material variations, and operating parameters may vary, causing downtime to occur without a component failure. Each of these occurrences is considered to be a failure mode of the system.

These data can be parameterized into several different parametric distributions, depending upon the type of parametric equation one selects. For example an exponential, normal, lognormal, Weibull, gamma, Bernoulli, negative binomial, Poisson, hypergeometric, or other distributions may be selected. These distributions, and others are discussed in the aforementioned Handbook of Reliability Engineering and Management, at chapt. 19. One of skill will recognize a time shift function may be incorporated if desired, however, for simplification it is not included in the analysis below. The approach described and claimed herein is also generalizable to non-parametric models.

An exponential distribution is given by the equations $$R(t) = \exp(-\lambda * t) \qquad 9$$

$$PDF(t) = \lambda \exp(-\lambda * t) \qquad 10$$

$$h(t) = \lambda \qquad 11$$

$\lambda = 1/MTBF$ for modeling uptime, and $\lambda = 1/MTTR$ for modeling downtime. $\qquad 12$ where t is time measured in any appropriate unit and equations 9–11 can be used for uptime and downtime data. A Weibull distribution is given by the equations $$R(t) = \exp[-(t/\alpha)^\beta] \qquad 13$$

$$PDF(t) = [(\beta/\alpha)*(t/\alpha)^{\beta-1}]*R(t) \qquad 14$$

$$h(t) = [(\beta/\alpha)*(t/\alpha))^{\beta-1}] \qquad 15$$

$MTTR = \alpha\Gamma(1/\beta+1)$ for downtime and $MTBF = \alpha\Gamma(1/\beta+1)$ for uptime $\qquad 16$ where $\alpha$ is the scale parameter, $\beta$ is the shape parameter and $\Gamma(1/\beta+1)$ is the gamma function evaluated at $(1/\beta+1)$.

The exponential distribution is widely used in the Reliability Engineering literature. The Weibull distribution is useful for systems having an expected minimum life and components which rarely fail before the expected minimum life occurs. The Weibull distribution is more general than the exponential distribution since the Weibull distribution is equivalent to the exponential distribution for $\beta=1$. The Weibull distribution is the most versatile of the distributions cited herein and will be used throughout the following discussion. However, it is to be understood that any of the aforementioned illustrative and non-limiting distributions can be used for parameterizing data, as well as other distributions known to one of ordinary skill.

Once a distribution, such as a Weibull distribution, is selected, it can separately model system downtimes and system uptimes. $\alpha$ is the scale parameter and scales as MTBF or MTTR. $\beta$ is the shape parameter and determines the shape of the distribution. The actual values for $\alpha$ and $\beta$ for any system component can be determined directly from similar equipment data by the method of maximum likelihood for downtimes and maximum likelihood with censoring for uptimes. These methods are known to one of ordinary skill and are discussed in:

http://www.asp.ucar.edu/colloquium/1992/notes/part1/node20.html;

http://www.math.uah.edu/stat/point/point3.html;

http://physics.valpo.edu/courses/p310/ch4_maxLike/sld001.html; and http://www.basic.nwu.edu/statguidefiles/survival.html.

The mathematical model of the system developed below uses the nonlimiting exemplary and preferred Weibull distribution for parameterizing the uptime (excluding false starts) and downtime data. Particularly, f(t), the overall system reliability as a function of time Rsys(t), Availability, MTBF, and MTTR will be developed and analytically determined.

From equations 3, 4, and 13, the system reliability can be related to the uptime PDF for any component in the system based upon n components subject to failure. The relationship is given by the formula:

$$R_{sys}(t) = \Pi(R_i(0)*\exp[-(t/\alpha_i)^{\beta_i}]) \quad\quad 17$$

where the subscript i refers to component i and the product includes all components of the system.

The expected time the system is running between failures, MTBFsys, is determined from equation 5 using equation 17. Equation 5 can readily be solved analytically for the exponential distribution and numerically for the Weibull and other distributions. Similarly, the mean time to repair any component i of the system is given by equation 16 using the downtime parameters $\alpha_{down}i$ and $\beta_{down}i$.

Therefore, it is only necessary to evaluate $Pevent_i$ in equation 8 in order to calculate availability in equation 1, where $Pevent_i$ is the probability that a failure of component i will stop the system. Below is a simple method to determine $Pevent_i$ from the individual component uptime probability functions.

A component can fail in two ways. It can fail as a false start never letting the system reach its target production rate, or it can fail after the system has attained full rate. Algebraically, the probability of this occurrence is expressed as:

$$Pevent_i = Pevent0_i + PeventNot0_i \quad\quad 18$$

where $Pevent_i$ is the probability of observing a component failure, $Pevent0_i$ is the probability of a component failure, which interrupts operation of the system upon startup with an uptime equal to zero, and $PeventNot0_i$ is the probability that a particular event will cause the system to fail other than on startup and with an uptime greater than zero.

Referring to the second term in equation 18, the probability that component i will cause the system to stop after it has reached full production rate, $PeventNot0_i$ is given by:

$$PeventNot0_i = \int_0^\infty h_i(t)*R_{sys}(t)dt. \quad\quad 19$$

For the exemplary and nonlimiting Weibull distribution, Rsyst(t) is the overall system reliability at any time t given by equation 17, and $h_i(t)$ is the hazard function for component i at any time t given by equation 15. Equation 19 can be solved analytically for exponential uptime distributions and numerically for Weibull and other distributions. Since equation 19 is not found in the prior art, its derivation is shown below.

If tf is the time the system fails, then from the definition of the hazard function $$h_i(t)dt = \text{prob}(t < tf < t+dt | t < tf) \text{ and} \quad\quad 20$$

is the probability that the system will fail between time t and t+dt due to component i, given that component i did not fail before time t.

But, in a competing failure system with a SAN repair policy for all components at each failure, an individual component will reach time t only if the whole system reaches time t. Given that the probability that a system will reach time t is given by:

$$R_{sys}(t) = \text{prob}(t < tf) \quad\quad 21$$

and is the probability that the system will not fail before time t.

Then, from the definition of conditional probability $h_i(t)*R_{sys}(t)dt$=the probability that the system will fail due to component $i$ between time $t$ and $t+dt$.   22

The integral of equation 22 over all possible times is equal to the probability that component i will stop the system at any time t>0 as expressed in equation 19, thus completing the derivation.

The first term in equation 18 must also be considered, that is the probability of a false start; i.e., a component failure at time 0. For a competing failure mode system, when a system repair is completed and the system is ready for startup, all components are susceptible to fail again before the system reaches its desired rate since the competing components are subject to a false start probability, R(0), at every attempt to start the equipment.

The estimation of a false start probability is complicated by the fact that multiple components may be susceptible to simultaneous failure at startup, but only one component is considered to fail for all practical purposes. A false start is assigned only to one component. Two exemplary and nonlimiting tie-breaker resolution methods are discussed below, although other methods are possible and within the scope of the claimed invention.

In the first method, if multiple components false start simultaneously, the false start is randomly assigned to any one of the components involved in the false start. This method recognizes that a false start duration is a very short positive time. The first component to fail during this very short time could randomly occur. Under this method, each simultaneously occurring failure mode has an equal probability of being designated the cause of the false start.

Another exemplary and nonlimiting method of dealing with simultaneous multiple component false starts is to assign the false start to the dominant failure of the components involved. The dominant failure is considered to be either the fastest failure to occur, be detected or recorded, or be the one with the longest time to repair. A way to implement the second illustrative and non-limiting method to assign the cause of the false start event to a particular failure mode is to consider that each failure mode has a factor associated therewith. The failure mode selected as the cause of the false start is selected based upon the dominance of that factor over corresponding factors of the other failure modes involved in the tie.

For example, the factor may be the mean time to repair that failure mode. Thus, in this case the dominance of a particular component or failure mode is governed by the failure mode having the greatest mean time to repair. Alternatively, the factor may be the failure mode known to be the first one to fail among the other failure modes involved in the tie. Of course, other factors may be used as well.

To compute $Pevent0_i$ for each component the probability of a false start is considered to be independent of which component had previously failed and independent of other components in the system. In this case it is possible to determine the probability that the system will not have a false start after a failure. Mathematically, this is given by $$R_{sys}(0) = \Pi R_i(0) \quad\quad\quad 23$$

From probability theory, the probability that component i will be involved in a false start event can be obtained by replacing the term $R_i(0)$ by $1-R_i(0)$ in equation 23. This substitution applies for events where more than one component can have a false start. For example, in a system having eight or more components, the probability that only components 1, 3 and 8 will have a simultaneous false start is given by:

$$x(1,3,8) = R_{sys}(0) * [(1-R_1(0))*(1-R_3(0))*(1-R_8(0))/(R_1(0)*R_3(0)*R_8(0))] \quad\quad\quad 24$$

where $x(1,3,8)$ is the probability that components 1, 3, and 8 will simultaneously have a false start. The bracketed term in equation 24 has the effect of replacing the term $R_i(0)$ with $(1-R_i(0))$ for i=1, 3 and 8.

Using the previous example, the probability of designating component 1 as the cause of the false start when an event with the simultaneous failure of components 1, 3 and 8 occurs depends on the specific tie-breaker method selected. If the assignment is random, then one third of the probability given by $x(1,3,8)$ in equation 24 is assigned to component 1 since there are three components involved in the simultaneous failures of the false start. On the other hand, if the failure of component 1 dominates the failure of the other two components, the entire probability of the value in equation 24 is assigned to component 1. Components 3 and 8 are assigned a zero probability for this particular event.

| $y_1(1, 3, 8) = $ | $x(1, 3, 8)/3$ | if a random component assignment occurs |
| | $x(1, 3, 8)$ | if component 1 is dominant |
| | $0$ | if component 3 or 8 is dominant | where $y_1(1,3,8)$ is the probability that components 1, 3 and 8 will have a simultaneous false start and the failure of component 1 will be designated the cause of the false start.

The probability of having a specific set of components simultaneously false start in the same event is mathematically given by:

$$x(J) = R_{sys}(0) * \Pi[(1-R_j(0))/R_j(0)] j \in J \quad\quad\quad 26$$

where the subscript j is now limited to only those components that will simultaneously false start. Mathematically it is denoted as j is an element of the set J of components having the capability of a simultaneous false start and x(J) is the probability of having an event where j is an element of the set J.

If the assignment is random, then the probability given by x(J) in equation 26 must be divided by the total number of components possibly involved in the tie and the resulting value must be assigned to each of the components involved in equal shares. On the other hand, if any given failure dominates the other, then the full probability in equation 26 must be assigned to the dominant component and the remaining components must have a zero probability assigned for this particular event. Generally, this can be expressed as:

| | x(J)/(size of J) | if component is randomly selected |
| $y_i(J) = $ | x(J) | if component is dominant |
| | 0 | if a component other than i is dominant | where $y_i(J)$ is the probability that components of the set J will simultaneously have a false start and that component i will dominate the others and be designated as the cause of the false start.

It is possible to design a computational algorithm that will calculate $Pevent0_i$ in equation 18 by generating all possible combinations of the sets J of failure events containing the ith component, computing the probability of each event using in equation 26, and then summing the corresponding assigned probability using equation 27. This is expressed mathematically by:

$$Pevent0_i = \Sigma y_i(J) \quad\quad\quad 28$$

where the sum is for all possible sets J.

For example, assume that the system has 3 components. From equation 28, $Pevent0_1$ is obtained by summing the probability that component 1 will have a false start alone, plus the probability that component 1 will have a false start simultaneously with component 2 and dominate, plus the probability that component 1 will have a false start simultaneously with component 3 and dominate, plus the probability that component 1 will have a false start simultaneously with components 2 and 3 and dominate. Mathematically, this nonlimiting example can be expressed as $$Pevent0_1 = y_1(1) + y_1(1,2) + y_1(1,3) + y_1(1,2,3) \quad\quad\quad 29$$

Equation 28 is viable and within the scope of the present invention, but requires one of skill to compute all possible combinations of simultaneous false starts. If the number of components is very large, then this method of evaluating probabilities for every event will become large because the number of potential combinations grows at the rate of $2^{(N-1)}$, where N is the total number of components in the system. It would therefore be useful to have a more efficient method to analyze false starts for systems having a large number of components.

Equation 28 can also be written for N components, failure modes, or events as $$Pevent0_i = \Sigma_{k=1}^{N} y_i^{(k)} \quad\quad\quad 30$$

wherein $Pevent0_i$ is the probability that the event of interest will be observed, N is the total number of components or events which may simultaneously occur, the index i refers to component i, and $y_i^{(k)}$ is the sum of all $y_i(J)$ where the sets J have a size k. Thus, $y_i^{(k)}$ is the probability that the event of interest will be observed when the event occurs simultaneously with k−1 other events. Likewise, this is also the probability that a failure of component i will be observed when component i fails simultaneously with k−1 other components.

For example, if we have four components:

$y_1^{(1)} = y_1(1)$
$y_1^{(2)} = y_1(1,2) + y_1(1,3) + y_1(1,4)$
$y_1^{(3)} = y_1(1,2,3) + y_1(1,2,4) + y_1(1,3,4)$
$y_1^{(4)} = y_1(1,2,3,4)$ where component 1 is an element in each set.

A simplified algorithm to determine the probability of a false start event, Pevent0$_i$, is given by the following steps.

Step 1: Obtain the probability that component i will have a false start alone.

$$y_i^{(1)} = R_{sys}(0) * [(1-R_i(0))/(R_i(0))] \quad\quad 31$$

where R$_{sys}$(0) is the probability that the system will not have a false start and is given by equation 23.

Step 2: Compute the residual probability of having a simultaneous false start of 2 or more components.

$$\text{Residual}^{(0)} = 1 - \Pi_{j=1}^{N} R_j(0)$$

$$\text{Residual}^{(1)} = 1 - R_{sys}(0) - \Sigma_{j=1}^{N} y_j^{(1)}$$

$$\text{Residual}^{(n)} = \text{Residual}^{n-1} - \Sigma_{j=1}^{N} y_j^{(n)} \quad\quad 32$$

Step 3: If the residual is small enough stop, otherwise set n=1 and proceed. A predetermined error, or residual, of $10^{-6}$ has been found to work well.

Step 4: Compute the probabilities that component i will have a false start simultaneously with one or more other components in ties involving progressively more components.

(a) If all components randomly dominate the tie then:

$$y_i^{(n+1)} = [(1-R_i(0))/(R_i(0)*(n+1))] * [\Sigma_{j=1}^{N} y_j^{(n)} - n*y_i^{(n)}] \quad\quad 33a$$

for all components i from 1 to N.

(b) If component 1 dominates component 2, and component 2 dominates component 3, and, in general component k dominates any component p where p>k then:

$$y_i^{(n+1)} = [(1-R_i(0))/R_i(0)] \Sigma_{j=i+1}^{N} y_j^{(n)} \quad\quad 33b$$

for all components i from 1 to N.

Step 5: Compute the probability of having a simultaneous false start of more than n+1 components.

$$\text{Residual}^{(n+1)} = \text{Residual}^{(n)} - \Sigma_{j=1}^{N} y_j^{(n+1)} \quad\quad 34$$

Step 6: It will be apparent to one of skill that Residual$^{(n)}$ decreases as n increases. If the residual is small enough or n+1=N stop; otherwise, make n=n+1 and proceed to step 4.

We now have a complete method to determine availability for a system of competing components.

(1) Determine for each component i, i=1 to N, the probability of that component dominating a false start (Pevent0$_i$) using the foregoing algorithm with equations 30 to 34.

(2) Determine for each component i, i=1 to N, the probability of that component failing without a false start (PeventNot0$_i$) using equation 19.

(3) Determine for each component i, i=1 to N, the probability of that component being the cause of the failure (Pevent$_i$) from the previous 2 steps and equation 18.

(4) Determine for each component i, i=1 to N, its mean time to repair (MTTR$_i$) by using equation 7 or another suitable equation from the literature for the component repair distributions.

(5) Determine the system mean time to repair (MTTR$_{sys}$) from steps 3 and 4 and equation 8.

(6) Determine the system mean time between failures (MTBF$_{sys}$) from equation 5.

(7) Determine the system availability from steps 5-6 and equation 1.

One exemplary and non-limiting use of the claimed invention is to calculate the probability of an event occurring, by taking into account the frequency of observing, Pevent(0)$_i$, when the event occurs alone or with at least one other event. According to the method, one iteratively adjusts the value of R$_i$(0) until a predetermined error threshold is reached. The method comprises the steps of:

(A) Selecting a value of R$_i$(0).

For example one possible value may be R$_i$(0)=1−Pevent0$_i$ (B) determining a value of Pevent$_{determined}$0$_i$ from the equation Pevent$_{determined}$0$_i$=$\Sigma_{n=1}^{N} y_i^{(n)}$.

(C) If the determined value of Pevent$_{determined}$0$_i$ is within a predetermined tolerance from the known value of Pevent$_{actual}$0$_i$, then stop.

(D) If the determined value of Pevent$_{determined}$0$_i$ is not within a predetermined tolerance of the known value of Pevent$_{actual}$0$_i$ then adjust the value of R$_i$(0) until the observed value of Pevent0$_i$ converges to the actual value of Pevent0$_i$. One such method may be made by adjusting R$_i$(0)$_{new}$ according to the equation R$_i$(0)$_{new}$= R$_i$(0)$_{old}$+Pevent$_{determined}$0$_i$−Pevent$_{actual}$0$_i$, although many other methods are known to one of skill and will not be repeated here.

(E) Repeat step (D) until the determined value of Pevent$_{determined}$0$_i$ is within the predetermined or desired tolerance.

A system can, of course, have both competing and non-competing components. For example, a production system may require a raw material that comes in a tank, roll, box or other finite batch form. Once the batch of raw material is depleted, the equipment may have to stop to bring a new batch. The duration between stops necessary to replenish the raw material is a function of its batch life. The running time from one batch replenishment to the next is not a function of any other failures in the system. The batch replenishment component in this system is therefore non-competing. Thus, for certain systems one may wish to have a generalized approach which can estimate availability of a system having both competing and non-competing failures.

Any non-competing component having a mean time between failures (MTBF$_i$) that is independent of the other failures in the system can be converted to an equivalent competing component with an exponential uptime distribution, with the same failure rate and no false starts. Mathematically, $$R_i(0)=1, \lambda_i=1/MTBF_i \quad\quad 35$$

or, using a Weibull uptime distribution $$R_i(0)=1, \alpha_i=MTBF_i \text{ and } \beta_i=1 \quad\quad 36$$

The conversion is possible since MTBF$_i$ for an exponential competing component is independent of the other components in the system and thus the model will predict the same number of stops.

Below is a mathematical proof that MTBF$_i$ for an exponential competing component is independent of the MTBF$_j$ of other components in the system and thus is equal to 1/$\lambda_i$.

From the definition of MTBF $$MTBF_i = \text{total uptime/total stops due to component } i$$

$$= MTBF_{sys}/Pevent_i$$

From equations 18 and 19 and since Pevent0$_i$=0 when R$_i$(0)=1

$$MTBF_i = MTBF_{sys}/\int_0^\infty h_i(t)*R_{sys}(t)dt \quad\quad 37$$

For an exponential function we can use the hazard function in equation 11

$$MTBF_i = MTBF_{sys} \Big/ \left( \int_0^\infty \lambda_i * R_{sys}(t) \, dt \right) \qquad (38)$$

$$= MTBF_{sys} \Big/ \left( \lambda_i * \int_0^\infty R_{sys}(t) \, dt \right)$$

Finally, from equation 5

$$MTBF_i = MTBF_{sys} / (\lambda_i * MTBF_{sys}) \qquad (39)$$

$$= 1/\lambda_i$$

Thus, one of skill may analyze a non-competing component in the analysis by transforming it into an exponential competing component with no false starts.

If desired, either term on the right-hand side of equation 18 may be set to 0. If the term $\int_0^\infty h_i(t)*R_{sys}(t)dt$ is set equal to 0, the equation and method of equation 18 is non-combinatorial. This allows one of skill to calculate the probability that each event will occur using the equation $Pevent0_i = \Sigma_{n=1}^N y_i^{(n)}$ where $y_i^{(n)}$ is the probability the event of interest will be observed when that event occurs simultaneously with n-1 other events, and N is the total number of possible events which may simultaneously occur in that system. To do this, one will determine the probability that event i will be observed alone or, likewise, that component i will fail alone, according to the equation $$y_i^{(1)} = [(1-R_i(0))/R_i(0)] * \Pi_{j=1}^N R_j(0),$$

where $R_j(0)$ is the probability that event will not occur or component will not fail.

Likewise, the second term in equation 18 may be set to 0. Doing this yields the equation $Pevent_i = \int_0^\infty h_i(t)*R_{sys}(t)dt$. Thus, using equation 18, one may calculate the probability that an event in the system will be observed following start-up of the system, or that a component in the system will fail following start-up of the system.

Using the aforementioned mathematical relationships, the following questions can be answered:

1. How much improvement in availability will result from eliminating a specific failure mode?
2. Which failure mode, if eliminated, will result in the greatest system availability improvement?

One exemplary and non-limiting method for determining which component uptime has the greatest impact on system availability is to mathematically set the reliability of that component to unity. From equation 3, setting the reliability to unity requires that the probability of not having a false start and $R_{uptime}(t)$ both be set to 1. For a Weibull distribution, as $\alpha$ approaches infinity, $R_{uptime}(t)$ approaches 1. If $\alpha$ is taken to be a very large number, the component reliability will approximate infinite life and failure of that component is effectively removed from the system.

Thus, for a Weibull distribution, each component, in turn, may be mathematically eliminated from the system by providing that component with a large value of $\alpha$. The total system reliability is then recalculated with each component having been mathematically removed, in turn, as a possible failure mode. Then each of the resulting system reliabilities, which will equal the total number of components in the system, is examined to see which reliability is the greatest. The greatest of these system reliabilities shows which component reliability improvement will have the greatest impact on overall system reliability.

The simple process, described and claimed herein, and the supporting calculations may be set forth in a computer program. While the program has been written using VISUAL BASIC FOR EXCEL, one of skill will recognize such a program may also be written in many other programming languages, such as but not limited to C++, Fortran, Java, Prolog and Pascal. While the solution described and claimed herein may be implemented by a computer program, for convenience, one of skill will recognize the invention is not so limited. The solution may also be performed using manual calculations, computer-aided solutions, and/or combinations thereof.

The procedure used in the program has the following steps

1. Read the data and make any necessary error checks.
2. Convert non-competing components to competing components having exponential uptime distributions with the same failure rate and no false starts.
3. Set the equations to compute the availability of the system using the method described and claimed herein.
4. Record the system availability.
5. For each failure mode, determine the improvement in the system availability by:
   a. temporarily forcing the time between failures for that particular mode to be very large. For a Weibull uptime distribution this is achieved by setting alpha uptime to a very large value and beta uptime equal to one. Also prevent any false start for the variable by setting temporarily $R_i(0)$ to one,
   b. recomputing the system availability, and
   c. optionally recording the system availability improvement.
6. Optionally, sort the components in rank order, based on the impact of each failure mode on overall system availability.

EXAMPLE I

---

Step 4:

Compute System MTBF $$MTBF_{sys} = \int_0^\infty R_{sys}(t) \, dt$$

$$R_{sys}(t) = \prod R_i(t) = \prod R(0)_i e^{-\left(\frac{t}{alphaUT_i}\right)^{betaUT_i}}$$

-continued

MIBF$_{sys}$ = 27.15811
*Formulas based on a Weibull Distribution
MTBF is obtained by numerical integration Step 5:

For each of the failure modes use numerical integration to calculate PeventNot0,
the probability that a failure mode will stop the system with no false start.
It takes into account the system interaction between components (R(0) does not take into account the interaction)

$$\text{PeventNot0}_i = \int_0^\infty h_i(t) R_{sys}(t) \, dt$$

where $$h_i(t) = \frac{\text{betaUT}_i}{\text{alphaUT}_i} \left( \frac{t}{\text{alphaUT}_i} \right)^{\text{betaUT}_i - 1}$$

$$R_{sys}(t) = \prod R_i(t) = \prod R(0)_i e^{-\left(\frac{t}{\text{alphaUT}_i}\right)^{\text{betaUT}_i}}$$

*Formulas based on a Weibull Distribution

|    | alphaUT   | betaUT | R(0)  | Comp | PeventNot0 (by numerical integration) |
|----|-----------|--------|-------|------|-----------|
| F1 | 2262.6    | 0.666  | 0.98  | 1    | 0.029677  |
| F2 | 10766.2   | 0.432  | 0.993 | 1    | 0.034660  |
| F3 | 267783.7  | 1      | 1     | 0    | 0.000103  |
| F4 | 911.1     | 0.752  | 0.925 | 1    | 0.045476  |
| F5 | 518.5     | 0.277  | 0.962 | 1    | 0.201853  |
| F6 | 405.5     | 0.256  | 0.892 | 1    | 0.230329  |
| F7 | 405.5     | 0.256  | 1     | 1    | 0.230329  |

0.772426 total for system
Must be the same as in step 2

Step 6:

For each of the failure modes use numerical integration to calculate Pevent 0,
the probability that a failure mode will stop the system in a false start Step 6a:

Fisrst, compute the probability that a component will have a false start alone
The notation y(1) is used to represent the probability
Compute the residual probability.
The Residual is the probability of having more than n components simultaneously have a false start $$y_i(1) = \frac{1 - R(0)_i}{R(0)_i} R(0)_{sys} = \frac{1 - R(0)_i}{R(0)_i} \times 0.772426$$

Residual (0) = 1 − R(0)$_{sys}$ = 1 − 0.772426 = 0.227574
Residual (n + 1) = Residual (n) − Σy$_j$ (n + 1)
For example:

$$y_{F1}(1) = 0.772426 * \left( \frac{1 - 0.98}{0.98} \right) = 0.0157638$$

Residual(1) = Residual(0) − Σy$_j$(1) = 0.227574 − 0.207872 = 0.019702

|    | alphaUT  | betaUT | R(0)  | PeventNot0 | 1 − R(0) | y(1)      |
|----|----------|--------|-------|------------|----------|-----------|
| F1 | 2262.6   | 0.666  | 0.98  | 0.029677   | 0.02     | 0.0157638 |
| F2 | 10766.2  | 0.432  | 0.993 | 0.034660   | 0.007    | 0.0054451 |
| F3 | 267783.7 | 1      | 1     | 0.000103   | 0        | 0         |
| F4 | 911.1    | 0.752  | 0.925 | 0.045476   | 0.075    | 0.0626291 |
| F5 | 518.5    | 0.277  | 0.962 | 0.201853   | 0.038    | 0.0305116 |
| F6 | 405.5    | 0.256  | 0.892 | 0.230329   | 0.108    | 0.0935225 |
| F7 | 405.5    | 0.256  | 1     | 0.230329   | 0        | 0         |

0.207872 Sum of y(1)'s
0.019702 Residual(1)

-continued

Step 6b:

Compute the probability that a component will have a false start when involved in multiple simultaneous ties
Repeat until the residual is small enough $$y_i(n+1) = \left(\frac{1-R(0)_i}{R(0)_i}\right)\frac{\left[\sum y_j(n) - n \times y_i(n)\right]}{n+1}$$

For Example:

$$y_{F1}(2) = \left(\frac{1-0.98}{0.98}\right)\frac{(0.207872 - 0.0157638)}{2} = 0.0019603$$

$$y_{F1}(3) = \left(\frac{1-0.98}{0.98}\right)\frac{(0.0189875 - 2 \times 0.0019603)}{3} = 0.0001025$$

Residual(3) = Residual(2) − Σy$_j$(3) = 0.0.0007142 − 0.000704 = 1.025 × 10$^{-5}$

|    | alphaUT  | betaUT | R(0)  | PeventNot0 | y(1)      | y(2)      | y(3)     | y(4)     |           |
|----|----------|--------|-------|------------|-----------|-----------|----------|----------|-----------|
| F1 | 2262.6   | 0.666  | 0.98  | 0.029677   | 0.0157638 | 0.0019603 | 0.0001025 | 2.023E−06 |           |
| F2 | 10766.2  | 0.432  | 0.993 | 0.03466    | 0.0054451 | 0.0007135 | 4.126E−05 | 1.022E−06 |           |
| F3 | 267783.7 | 1      | 1     | 0.000103   | 0.0000000 | 0         | 0        | 0        |           |
| F4 | 911.1    | 0.752  | 0.925 | 0.045476   | 0.0626291 | 0.0058882 | 0.0001949 | 2.418E−06 |           |
| F5 | 518.5    | 0.277  | 0.962 | 0.201853   | 0.0305116 | 0.003503  | 0.0001578 | 2.278E−06 |           |
| F6 | 405.5    | 0.256  | 0.892 | 0.230329   | 0.0935225 | 0.0069225 | 0.0002075 | 2.462E−06 |           |
| F7 | 405.5    | 0.256  | 1     | 0.230329   | 0.0000000 | 0         | 0        | 0        |           |
|    |          |        |       |            | 0.2078721 | 0.0189875 | 0.000704 | 1.02E−05 | Sum of y(n)'s |
|    |          |        |       |            | 0.0197017 | 0.0007142 | 1.025E−05 | 4.309E−08 | Residuals |

There is no need to add more terms since the residual is small enough!

Step 6c:

ComputePevent0, the probability that a failure mode will create a false start
Pevent0$_i$ = Σy$_i$(n) = y$_i$(1) + y$_i$(2) + y$_i$(3) + y$_i$(4)
Pevent0$_{F1}$ = 0.015764 + 0.0019603 + 0.0001025 + 2.02 × 10$^{-6}$ = 0.017829

|    | alphaUT  | betaUT | R(0)  | PeventNot0 | y(1)      | y(2)      | y(3)     | y(4)     | Pevent0     |
|----|----------|--------|-------|------------|-----------|-----------|----------|----------|-------------|
| F1 | 2262.6   | 0.666  | 0.98  | 0.029677   | 0.0157638 | 0.0019603 | 0.0001025 | 2.023E−06 | 0.017828607 |
| F2 | 10766.2  | 0.432  | 0.993 | 0.03466    | 0.0054451 | 0.0007135 | 4.126E−05 | 1.022E−06 | 0.006200874 |
| F3 | 267783.7 | 1      | 1     | 0.000103   | 0         | 0         | 0        | 0        | 0           |
| F4 | 911.1    | 0.752  | 0.925 | 0.045476   | 0.0626291 | 0.0058882 | 0.0001949 | 2.418E−06 | 0.068714689 |
| F5 | 518.5    | 0.277  | 0.962 | 0.201853   | 0.0305116 | 0.003503  | 0.0001578 | 2.278E−06 | 0.034174638 |
| F6 | 405.5    | 0.256  | 0.892 | 0.230329   | 0.0935225 | 0.0069225 | 0.0002075 | 2.462E−06 | 0.100654971 |
| F7 | 405.5    | 0.256  | 1     | 0.230329   | 0         | 0         | 0        | 0        | 0           |
|    |          |        |       | 0.772426   |           |           |          | Total    | 0.22757378  |
|    |          |        |       |            |           |           |          | Must add to Residual (0) in step 4a | |

Step 7:

Compute the probability of a failure stopping the system with or without a false start
It takes into account the system interaction between components (R(0) does not take into account the interaction)
Pevent = PeventNot0 + Pevent0

|    | alphaUT  | betaUT | R(0)  | Comp | PeventNot0 | Pevent0  | Pevent   |                        |
|----|----------|--------|-------|------|------------|----------|----------|------------------------|
| F1 | 2262.6   | 0.666  | 0.98  | 1    | 0.029677   | 0.017829 | 0.047506 |                        |
| F2 | 10766.2  | 0.432  | 0.993 | 1    | 0.034660   | 0.006201 | 0.040861 |                        |
| F3 | 267783.7 | 1      | 1     | 0    | 0.000103   | 0.000000 | 0.000103 |                        |
| F4 | 911.1    | 0.752  | 0.925 | 1    | 0.045476   | 0.068715 | 0.114190 |                        |
| F5 | 518.5    | 0.277  | 0.962 | 1    | 0.201853   | 0.034175 | 0.236027 |                        |
| F6 | 405.5    | 0.256  | 0.892 | 1    | 0.230329   | 0.100655 | 0.330984 |                        |
| F7 | 405.5    | 0.256  | 1     | 1    | 0.230329   | 0.000000 | 0.230329 |                        |
|    |          |        |       |      | 0.772426   | 0.227574 | 1.000000 | Totals must add to 1   |

-continued

Step 8:

Compute by failure mode MTTR $$MTTR_i = alphaDT_i \times \Gamma\left(1 + \frac{1}{betaDT_i}\right)$$

For example:

$$MTTR_{F1} = 0.99 \times \Gamma\left(1 + \frac{1}{0.673}\right) = 1.303113$$

*Formula based on a Weibull Distribution

|    | alphaUT  | betaUT | R(0)  | alphaDT | betaDT | PeventNot0 | Pevent0   | Pevent   | MTTR        |
|----|----------|--------|-------|---------|--------|------------|-----------|----------|-------------|
| F1 | 2262.6   | 0.666  | 0.98  | 0.99    | 0.673  | 0.029677   | 0.0178286 | 0.047506 | 1.303112732 |
| F2 | 10766.2  | 0.432  | 0.993 | 1.33    | 0.571  | 0.034660   | 0.0062009 | 0.040861 | 2.141420943 |
| F3 | 267783.7 | 1      | 1     | 1.11    | 0.681  | 0.000103   | 0         | 0.000103 | 1.44352639  |
| F4 | 911.1    | 0.752  | 0.925 | 3.17    | 6.084  | 0.045476   | 0.0687147 | 0.114190 | 2.943129033 |
| F5 | 518.5    | 0.277  | 0.962 | 6.08    | 1.201  | 0.201853   | 0.0341746 | 0.236027 | 5.717961446 |
| F6 | 405.5    | 0.256  | 0.892 | 7.9     | 0.964  | 0.230329   | 0.100655  | 0.330984 | 8.029302253 |
| F7 | 405.5    | 0.256  | 1     | 7.9     | 0.964  | 0.230329   | 0         | 0.230329 | 8.029302253 |

Step 9:

Compute System MTTR
$MTTR_{sys} = \Sigma(Pevent_i \times MTTR_i)$

|    | alphaUT  | betaUT | R(0)  | alphaDT | betaDT | PeventNot0 | Pevent0   | Pevent   | MTTR      | PeventMTTR  |
|----|----------|--------|-------|---------|--------|------------|-----------|----------|-----------|-------------|
| F1 | 2262.6   | 0.666  | 0.98  | 0.99    | 0.673  | 0.029677   | 0.0178286 | 0.047506 | 1.3031127 | 0.061905427 |
| F2 | 10766.2  | 0.432  | 0.993 | 1.33    | 0.571  | 0.034660   | 0.0062009 | 0.040861 | 2.1414209 | 0.087500629 |
| F3 | 267783.7 | 1      | 1     | 1.11    | 0.681  | 0.000103   | 0         | 0.000103 | 1.4435264 | 0.000148465 |
| F4 | 911.1    | 0.752  | 0.925 | 3.17    | 6.084  | 0.045476   | 0.0687147 | 0.114190 | 2.943129  | 0.33607678  |
| F5 | 518.5    | 0.277  | 0.962 | 6.08    | 1.201  | 0.201853   | 0.0341746 | 0.236027 | 5.7179614 | 1.349594813 |
| F6 | 405.5    | 0.256  | 0.892 | 7.9     | 0.964  | 0.230329   | 0.100655  | 0.330984 | 8.0293023 | 2.657569541 |
| F7 | 405.5    | 0.256  | 1     | 7.9     | 0.964  | 0.230329   | 0         | 0.230329 | 8.0293023 | 1.849380285 |
|    |          |        |       |         |        |            |           |          | System MTTR | 6.342175941 |

Step 10:

Compute System Availability $$Availability_{sys} = \frac{MTBF_{sys}}{MTBF_{sys} + MTTR_{sys}} = \frac{27.15811}{27.15811 + 6.342176} = 0.811$$

Step 11:

To analyze the impact of eliminating a failure mode,
A) Set alphaUT = 1e24
B) Set the R(0) = 1
C) Repeat steps 2 to 9
For example, if we eliminate failure mode F6, then

|    | alphaUT  | betaUT | R(0)  | alphaDT | betaDT | PeventNot0 | Pevent0   | Pevent   | MTTR      | PeventMTTR  |
|----|----------|--------|-------|---------|--------|------------|-----------|----------|-----------|-------------|
| F1 | 2262.6   | 0.666  | 0.98  | 0.99    | 0.673  | 0.059977   | 0.0188242 | 0.078801 | 1.3031127 | 0.102686954 |
| F2 | 10766.2  | 0.432  | 0.993 | 1.33    | 0.571  | 0.059648   | 0.0065463 | 0.066195 | 2.1414209 | 0.141750721 |
| F3 | 267783.7 | 1      | 1     | 1.11    | 0.681  | 0.000250   | 0         | 0.000250 | 1.4435264 | 0.000360402 |
| F4 | 911.1    | 0.752  | 0.925 | 3.17    | 6.084  | 0.096765   | 0.0725916 | 0.169357 | 2.943129  | 0.498438432 |
| F5 | 518.5    | 0.277  | 0.962 | 6.08    | 1.201  | 0.306195   | 0.0360893 | 0.342284 | 5.7179614 | 1.957168514 |
| F6 | 1.00E+24 | 0.256  | 1     | 7.9     | 0.964  | 0.000000   | 0         | 0.000000 | 8.0293023 | 0           |
| F7 | 405.5    | 0.256  | 1     | 7.9     | 0.964  | 0.343113   | 0         | 0.343113 | 8.0293023 | 2.754959197 |
|    |          |        |       |         |        |            |           |          | System MTTR | 5.455364221 |

System MTBF = 66.2826
System Availability = 0.924
Therefore, there is an improvement potential in the availability of 0.924 − 0.811 = 0.113 by eliminating failure mode F6
Step 12:

Repeat step 10 for every failure mode to identify the top failures that impact availability

| Eliminated Cause | Availability Result | Availability Improvement |
|------------------|---------------------|--------------------------|
| F6               | 0.924               | 0.113                    |
| F7               | 0.912               | 0.101                    |
| F5               | 0.900               | 0.089                    |
| F4               | 0.870               | 0.059                    |

-continued

| F1 | 0.839 | 0.028 |
| F2 | 0.832 | 0.021 |
| F3 | 0.811 | 0.000 |

Associated with each failure mode is at least one uptime mathematical distribution parameter and at least one downtime mathematical distribution parameter. The system availability may be recalculated based upon changes in the uptime and/or downtime mathematical distribution parameter.

However, if a new system is under consideration or a system which has not previously been utilized for the present purpose is under consideration, the uptime and downtime mathematical distribution parameters may not be known with certainty. In such case, at least one uptime mathematical distribution parameter and/or at least one downtime mathematical distribution parameter may be taken from one or more of the known systems. This technique can be very useful, as certain uptime or downtime mathematical distribution parameters may be taken from a first system, other uptime and/or downtime mathematical distribution parameters taken from a second system, etc. This allows the competing mathematical model for uptime and/or downtime to be more accurately framed, based upon parameters already known.

Once the availability of the system is calculated, a failure mode is selected as the cause of the false start, each failure mode may be eliminated one-by-one to determine the effect of removing that failure mode on the availability of the system. Then, optionally, the new system availabilities may be rank ordered based upon the removal of each failure mode in turn. This rank ordering allows one of skill to determine which failure mode, if eliminated or mitigated, would have the greatest effect on system availability. This is useful in determining how and where to allocate resources for system improvements.

For example, it may be determined that removing/repairing failure mode 1 would have the greatest positive impact on system availability. However, the cost of removing/fixing failure mode 1 may be great compared to the cost of removing/repairing failure mode 2, which provides almost the same impact on system availability, and can be implemented faster and at lesser cost. Thus, one of skill can use these data, comparing the effect on availability and costs/speed of implementation to decide if/how to allocate resources within the system and on what schedule. This provides the benefit of judiciously implementing those system improvements which will have the greatest impact on future operation of the system.

Of course, the foregoing method, as described and claimed herein, may be embodied on a server, a remote network, a CD Rom, or other computer readable medium. The method described and claimed herein may be accessed locally or remotely, as transmitted by a carrier wave.

Further, the method described and claimed herein may be carried out by a single party or by multiple parties. For example, one party, such as a plant, may gather the data relating to failure modes and/or event observations. Another party, such as an analyst, may perform the determination of the probabilities recited herein.

What is claimed is:

1. A method of calculating the probability of an event being observed during the occurrence of one or more simultaneous events in a system, said method comprising the step of calculating said probability according to the equation:

$$\text{Pevent}_i = \int_0^\infty h_i(t) * R_{sys}(t) dt + \text{Pevent0}_i,$$

wherein $\text{Pevent}_i$ is the probability that a particular event will be observed;

$h_i(t)$ is the instantaneous rate of occurrence of event i;

$R_{sys}(t)$ is the reliability function of the system in which said events may occur; and $\text{Pevent0}_i$ is the probability that an event will be observed when said event occurs simultaneously with other events; and i represents a particular event.

2. A non-combinatorial method according to claim 1, wherein $\int_0^\infty h_i(t) * R_{sys}(t) dt = 0$, and comprising the steps of:

calculating the probability of each said event occurring independently of said other events according to the equation:

$$\text{Pevent0}_i = \Sigma_{n=1}^{N} y_i^{(n)}$$

wherein $y_i^{(n)}$ is the probability the event of interest will be observed when said event occurs simultaneously with n−1 other events; and wherein N is the total number of possible events;

determining the probability that event i will be observed alone according to the equation:

$$y_i^{(1)} = [(1 - R_i(0))/R_i(0)] * \Pi_{j=1}^{N} R_j(0)$$

wherein $R_j(0)$ is the probability the event j will not occur; and calculating the probability that event i will be observed when said event i occurs simultaneously with at least one other event.

3. A method according to claim 2 wherein said step of calculating said probability that event will be observed when event i occurs simultaneously with at least one said other event is given by the equation:

$$y_i^{(n+1)} = [(1 - R_i(0))/(R_i(0) * (n+1))] * \Sigma_{j=1}^{N} y_j^{(n)} - n * y_i^{(n)}]$$

wherein n+1 indicates the addition of another simultaneously occurring event to consideration;

$y_i^{(n)}$ is the probability of the event of interest being observed as it occurs with n−1 other events, when said event is randomly selected from all of said simultaneously occurring events; and n is the number of simultaneously occurring events under consideration.

4. A method according to claim 2 wherein said step of calculating said probability that event will be observed when event i occurs simultaneously with at least one said other event is given by the equation:

$$y_i^{(n+1)} = [(1 - R_i(0))/(R_i(0)] * \Sigma_{j=i+1}^{N} y_j^{(n)}$$

wherein n+1 indicates the addition of another simultaneously occurring event to consideration; and $y_i^{(n)}$ is the probability of the event of interest being observed as it occurs with n−1 other events and event k will always be observed over event p for all p>k, wherein p and k are factors which designate the dominance of event k over event p.

5. A method according to claim 2 further comprising the step of determining the probability of the simultaneous occurrence of more than n events according to the equations:

$$\text{Residual}^{(0)} = 1 - \Pi_{j=1}^{N} R_j(0)$$

$$\text{Residual}^{(n)} = \text{Residual}^{(n-1)} - \Sigma_{j=1}^{N} y_j^{(n)}$$

wherein Residual$^{(0)}$ is the probability of any event occurring,

Residual$^{(n)}$ is the probability of any event occurring when more than n events are simultaneously occurring, and said event is one of said events which are simultaneously occurring;

Residual$^{(n-1)}$ is the probability of any event occurring when more than n−1 events are simultaneously occurring; and N is the total number of events.

6. A method according to claim 5 further comprising the step of determining the probability of the simultaneous occurrence of more than n events, by considering progressively larger values of n until said Residual$^{(n)}$ becomes less than a predetermined threshold using the equation:

$$\text{Pevent0}_i = \Sigma_{n=1}^{S} y_i^{(n)}$$

wherein S≤N.

7. A method according to claim 2, given a probability of observing Pevent0$_i$, of calculating the probability that event has occurred alone or with at least one other event by iteratively adjusting the value of $R_i(0)$ until said equation is within a predetermined error threshold using the steps of:
(a) selecting a value of $R_i(0)$;
(b) determining a value of Pevent0$_i$ from the equation:

$$\text{Pevent}_{determined} 0_i = \Sigma_{n=1}^{N} y_i^{(n)};$$

(c) if the determined value of Pevent0$_i$ is within a predetermined tolerance from the known value of Pevent0$_i$ then stop; and
(d) converging the value of Pevent$_{determined}$0$_i$−Pevent$_{actual}$0$_i$ for all values of i=1, 2, 3 . . . N until a predetermined tolerance is reached.

8. A method according to claim 1, wherein Pevent0$_i$=0, and comprising the step of determining the probability that an event in the system will be observed following a start-up of the system, by calculating said probability according to the equation:

$$\text{Pevent}_i = \int_0^\infty h_i(t) * R_{sys}(t) dt.$$

9. A method according to claim 8 further comprising the step of determining the availability of said system having alternating uptimes and downtimes, said method further comprising the steps of:
(a) collecting event data for said uptimes and said downtimes;
(b) organizing said data by failure mode;
(c) selecting a competing mathematical model for uptime and a mathematical model for downtime for each failure mode;
(d) performing a calculation to determine the availability of the system, said calculation comprising the steps of:

(i) calculating the Mean Time Between Failures for the system according to the equation:

$$MTBF_{sys} = \int_0^\infty R_{sys}(t) d(t)$$

wherein MTBF$_{sys}$ is the mean time between failures for all failure modes in the system;
and R$_{sys}$(t) is the reliability function of the system;
(ii) calculating for each failure mode the probability that said failure mode will cause said system to fail according to the equation:

$$\text{Pevent}_i = \int_0^\infty h_i(t) * R_{sys}(t) dt$$

wherein Pevent$_i$ is the probability that a particular failure mode will cause the system to stop during an uptime of the system;
h$_i$(t) is the instantaneous rate of failure of failure mode i; and
R$_{sys}$(t) is the reliability function of the system, said reliability function being based upon said mathematical model for uptime;
(iii) calculating the Mean Time to Repair the system according to the equation:

$$MTTR_{sys} = \Sigma(\text{Pevent}_i * MTTR_i)$$

wherein MTTR$_{sys}$ is the mean time to repair the system upon a failure mode occurring and MTTR$_i$ is the mean time to repair failure mode i when that failure mode occurs; and
(iv) calculating the availability of the system according to the equation:

$$\text{Availability} = MTBF_{sys}/(MTBF_{sys} + MTTR_{sys}).$$

10. A method according to claim 9 further comprising the step of considering at least two simultaneously occurring events when determining said availability, each of said events being able to cause a false start event to occur, said at least two events being mutually exclusive.

11. A method according to claim 8 further comprising the step of rank ordering said events according to the effect each said event has on the availability of the system.

12. A method according to claim 8 wherein each said event has at least one uptime mathematical distribution parameter and at least one downtime mathematical distribution parameter, and further comprising the step of recalculating said system availability based upon at least one change in said at least one uptime mathematical distribution parameter and/or said at least one downtime mathematical distribution parameter.

13. A method according to claim 12, comprising the step of combining at least one uptime mathematical distribution parameter and/or at least one downtime mathematical distribution parameter from a plurality of systems, and using said combined at least one uptime and/or at least one downtime mathematical distribution parameter to select said competing mathematical model for uptime and/or said mathematical model for downtime.

14. A method for determining the probability of a plurality of events occurring simultaneously, said method comprising the steps of:
(a) obtaining data specifying the probability of each said event occurring independently of said other events;
(b) organizing said data according to a failure mode associated with said event;
(c) calculating the probability of said events being simultaneously observed using a non-combinatorial equation; and (d) iteratively calculating the probability of each said event occurring independently of said other events based upon said non-combinatorial equation.

15. A computer readable medium comprising a method of calculating the probability of an event being observed during the occurrence of one or more simultaneous events in the system, wherein the probability is calculated according to the equation:

$$Pevent_i = \int_0^\infty h_i(t) * R_{sys}(t) dt + Pevent0_i,$$

wherein $Pevent_i$ is the probability that a particular event will be observed;

$h_i(t)$ is the instantaneous rate of occurrence of event i;

$R_{sys}(t)$ is the reliability function of the system in which said events may occur; and $Pevent0_i$ is the probability that one or more events will simultaneously be observed when said event occurs simultaneously with other events; and i represents a particular event.

16. A medium according to claim 15, wherein said medium is selected from the group consisting of a carrier wave, a compact disc, and a network server.

17. A computer program for determining the probability of an event being observed during the occurrence of one or more simultaneous events in the system, wherein the probability is determined by the computer program according to the equation $$Pevent_i = \int_0^\infty h_i(t) * R_{sys}(t) dt + Pevent0_i,$$

wherein $Pevent_i$ is the probability that a particular event will be observed;

$h_i(t)$ is the instantaneous rate of occurrence of event i; and $R_{sys}(t)$ is the reliability function of the system in which said events may occur;

and $Pevent0_i$ is the probability that one or more events will simultaneously be observed when said event occurs simultaneously with other events; and i represents a particular event.

18. A computer program according to claim 17, wherein $\int_0^\infty h_i(t) * R_{sys}(t) dt$ or $Pevent0_i$ is set equal to 0.

* * * * *

UNITED STATES PATENT AND TRADEMARK OFFICE
CERTIFICATE OF CORRECTION

PATENT NO. : 6,816,813 B2
DATED : November 9, 2004
INVENTOR(S) : Tan et al.

It is certified that error appears in the above-identified patent and that said Letters Patent is hereby corrected as shown below:

Column 5,
Line 13, delete the equation "$\int_0^{28} h_i(t)*R_{sys}(t)dt$" and insert therefor -- $\int_0^{\infty} h_i(t)*R_{sys}(t)dt$ --.

Signed and Sealed this

Second Day of August, 2005

JON W. DUDAS
*Director of the United States Patent and Trademark Office*